United States Patent
Bayer et al.

(10) Patent No.: US 7,303,214 B2
(45) Date of Patent: Dec. 4, 2007

(54) METALLIC COMPRESSION JOINT AND FUEL INJECTOR HAVING A METALLIC COMPRESSION JOINT

(75) Inventors: Johann Bayer, Strullendorf (DE); Wolfgang Koschwitz, Litzendorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/511,667

(22) Filed: Aug. 28, 2006

(65) Prior Publication Data
US 2007/0057095 A1 Mar. 15, 2007

(30) Foreign Application Priority Data
Aug. 26, 2005 (DE) .................. 10 2005 040 361

(51) Int. Cl.
*F16L 25/00* (2006.01)
(52) U.S. Cl. .................................. 285/328
(58) Field of Classification Search ............... 123/468, 123/469, 470; 285/328
See application file for complete search history.

(56) References Cited
U.S. PATENT DOCUMENTS
5,732,743 A * 3/1998 Livesay .................. 138/99
6,550,820 B2 * 4/2003 Baerts et al. ............ 285/288.1
2007/0141439 A1 * 6/2007 Vyas et al. ................ 429/38

FOREIGN PATENT DOCUMENTS
DE 199 00 405 7/2000

* cited by examiner

*Primary Examiner*—Thomas Moulis
(74) *Attorney, Agent, or Firm*—Kenyon & Kenyon LLP

(57) ABSTRACT

A fuel injector for fuel injection systems of internal combustion engines is described. The fuel injector includes an electromagnetic actuating element having a magnetic coil, a core, and a valve jacket as an outer magnetic circuit component and a movable valve closing body which interacts with a valve seat surface assigned to a valve seat body. The core and a connecting tube are fixedly joined in an inner opening of a thin-walled valve sleeve and the valve jacket at the outer circumference of the valve sleeve by pressing in or on. The fixed compression joint of two of these metallic components of the fuel injector is characterized in that at least one of the components has a surface-roughening structure in its compression area, it being possible to create the surface-roughening structure using a laser and metal oxides being deposited on the structure.

15 Claims, 3 Drawing Sheets

METALLIC COMPRESSION JOINT AND FUEL INJECTOR HAVING A METALLIC COMPRESSION JOINT

FIELD OF THE INVENTION

The present invention is directed to a metallic compression joint and a fuel injector.

BACKGROUND INFORMATION

A fuel injector that includes an electromagnetic actuating element having a magnetic coil, an inner pole and an external magnetic circuit component and a movable valve closing body that interacts with a valve seat assigned to a valve seat body is already described in German Published Patent Application No. 199 00 405. The valve seat body and the inner pole are situated in an internal opening of a thin-walled valve sleeve, and the magnetic coil and the external magnetic circuit component are situated on the outer circumference of the valve sleeve. For the attachment of the individual components in and on the valve sleeve, the magnetic circuit component designed in the form of a pot magnet is first slipped onto the valve sleeve; the valve seat body is then pressed into the internal opening of the valve sleeve so that solely the pressing-in of the valve seat body creates a fixed connection between the valve sleeve and the magnetic circuit component. After an axially movable valve needle is installed in the valve sleeve, the inner pole is affixed by pressing it into the valve sleeve. When the magnetic circuit component is pressed onto the valve sleeve, there is a great risk that the compression joint might release solely due to the pressing-in of the valve seat body. Pressing the inner pole into the valve sleeve causes undesired cold welds in the compression area.

SUMMARY OF THE INVENTION

The metallic compression joint according to the present invention has the advantage that it may be manufactured cost-effectively in a very simple manner. According to the present invention, the fixed compression joint of at least two metallic components is characterized in that at least one of the components has a structure in its compression area produced by a laser, the material vaporizing on the corresponding component during laser machining of the compression area forming a metal oxide, chromium oxide in particular, on its surface, which advantageously has sliding properties and reduces the tendency for cold welds to form.

It is an advantage that it is possible to produce compression joints between metallic components using economical components provided as deep drawn parts or turned parts that reliably remain fixed and tight over a long time period while avoiding cold welds. The metallic compression joints are produced very simply and cost-effectively due to the fact that it is advantageously possible to omit known and ordinarily necessary separate work operations such as coating or oiling for an improved fit of the components or heating the components for shrink fitting.

If, due to their stiffness, the components are unable to expand or compress or they are too soft due to the nature of the material, such as soft magnetic chromium steels that are ordinarily used for the most varied components of solenoid valves, such as electromagnetically driven fuel injectors, ABS valves, solenoid switching valves, fuel injection pumps, etc., there is a high probability that cold welds ("corroders") will occur in known compression joints during the joining action of the pressing-in, which, however, are avoided through the measures according to the present invention, in particular in components made from soft magnetic chromium steel. According to the present invention, it is possible to omit elaborate, precise, and cost-intensive machining operations such as precision grinding or honing which could narrow the component tolerances and could improve the compression joints only at considerable expense.

The fuel injector according to the present invention has the advantage that it may be manufactured cost-effectively in a very simple manner. According to the present invention, the fixed compression joint of at least two metallic components of the fuel injector is characterized in that at least one of the components has a structure in its compression area produced by a laser, the material vaporizing on the corresponding component during laser machining of the compression area forming a metal oxide, chromium oxide in particular, on its surface, which advantageously has sliding properties.

It is an advantage that it is possible to produce compression joints between metallic components using economical components provided as deep drawn parts or turned parts that reliably remain fixed and tight over a long time period while avoiding cold welds. The compression joints are produced very simply and cost-effectively due to the fact that it is advantageously possible to omit known and ordinarily necessary separate work operations such as coating or oiling for an improved fit of the components or heating the components for shrink fitting.

If, due to their stiffness, the components are unable to expand or compress or they are too soft due to the nature of the material, such as soft magnetic chromium steels that are ordinarily used for the most varied components of an electromagnetically driven fuel injector, there is a high probability that cold welds ("corroders") will occur in known compression joints during the joining action of the pressing-in, which, however, are avoided through the measures according to the present invention, in particular in components made from soft magnetic chromium steel. According to the present invention, it is possible to omit elaborate, precise, and cost-intensive machining operations such as precision grinding or honing which could narrow the component tolerances and could improve the compression joints only at considerable expense.

DETAILED DESCRIPTION

For a better understanding of the measures according to the present invention, a fuel injector as known from the related art including its basic components will be explained below with reference to FIG. 1.

Figure 1:
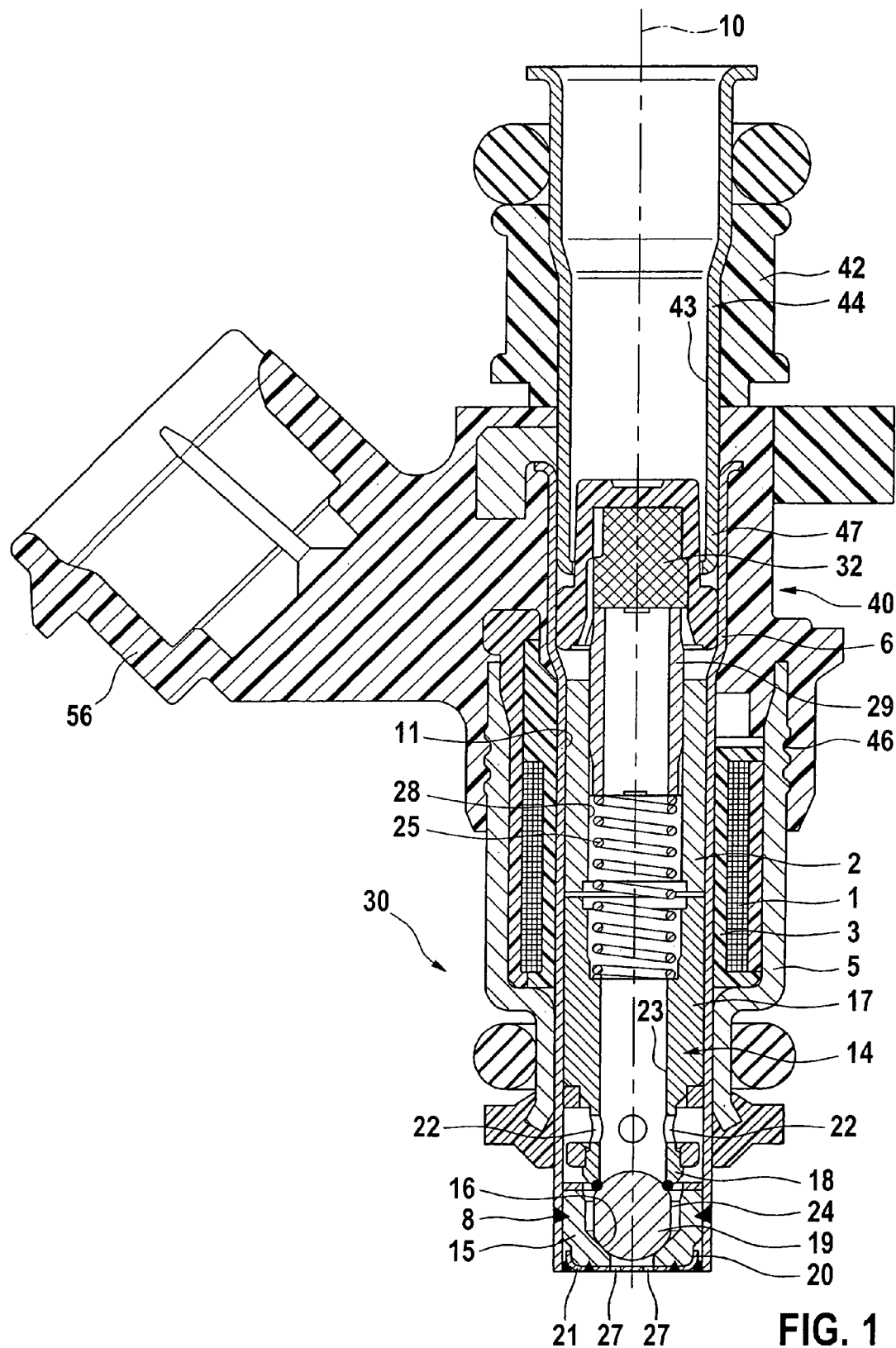
FIG. 1 shows a fuel injector as known from the related art.

The electromagnetically actuatable valve in the form of a fuel injector for fuel injection systems of mixture-compressing, spark-ignited internal combustion engines, which is shown as an example in FIG. 1, has a largely tubular core 2 which is used as an inner pole and partially for fuel delivery and is surrounded by a magnetic coil 1. The circumference of magnetic coil 1 is completely surrounded by an external, sleeve-shaped, and stepped ferromagnetic valve jacket 5, for example, which represents an outer magnetic circuit component in the form of a pot magnet used as an outer pole. Magnetic coil 1, core 2, and valve jacket 5 together constitute an electrically excitable actuating element.

While magnetic coil 1 embedded in a coil form 3 surrounds a valve sleeve 6 from the outside, core 2 is accommodated in an inner opening 11 of valve sleeve 6, which extends concentrically to a valve longitudinal axis 10. Valve sleeve 6, which is ferritic, for example, is designed to be elongated and thin-walled. Opening 11 is also used as a guide opening for a valve needle 14, which is axially movable along valve longitudinal axis 10. In the axial direction, for example, valve sleeve 6 extends over more than half the overall axial extension of the fuel injector.

In addition to core 2 and valve needle 14, a valve seat body 15 attached to valve sleeve 6 by a weld 8, for example, is also situated in opening 11. Valve seat body 15 has a fixed valve seat surface 16 as a valve seat. Valve needle 14 is, for example, formed by a tubular armature segment 17, a likewise tubular needle segment 18, and a spherical valve closing body 19, valve closing body 19 being fixedly connected to needle segment 18 by a weld, for example. A pot-shaped, for example, injection orifice disk 21 is situated on the downstream side of valve seat body 15, the bent over and circumferential retaining edge 20 of injection orifice disk 21 pointing upwards against the flow direction. The fixed connection of valve seat body 15 and injection orifice disk 21 is implemented by, for example, a circumferential solid weld. One or a plurality of transverse openings 22 are provided in needle segment 18 of valve needle 14 so that fuel flowing through armature segment 17 in an internal longitudinal bore 23 is able to emerge and flow along flat surfaces 24, for example, on valve closing body 19 to valve seat surface 16.

The fuel injector is actuated electromagnetically in a known manner. The electromagnetic circuit including magnetic coil 1, inner core 2, outer valve jacket 5 and armature segment 17 is used for the axial movement of valve needle 14 and accordingly for the closing or opening of the fuel injector against the spring force of a restoring spring 25 which engages valve needle 14. The end of armature segment 17 facing away from valve closing body 19 is aligned with core 2.

Spherical valve closing body 19 interacts with valve seat surface 16 of valve seat body 15, valve seat surface 16 tapering frustoconically in the flow direction and being formed downstream of a guide opening in the axial direction in valve seat body 15. Injection orifice disk 21 has at least one, for example four, discharge openings 27 produced by abrading, laser boring, or punching.

The insertion depth of core 2 in the fuel injector is, among other things, critical for the stroke of valve needle 14. The one end position of valve needle 14 when magnetic coil 1 is not excited is determined by the contact of valve closing body 19 on valve seat surface 16 of valve seat body 15, while the other end position of valve needle 14 when magnetic coil 1 is excited results from the contact of armature segment 17 at the downstream core end. The stroke setting results from an axial movement of core 2 which is manufactured, for example, by a machining operation such as turning, core 2 subsequently being fixedly connected to valve sleeve 6 corresponding to the desired position.

Inserted into a flow bore 28 of core 2 extending concentrically to valve longitudinal axis 10, which is used for the feed of fuel in the direction of valve seat surface 16, is an adjusting element in the form of an adjusting sleeve 29 in addition to restoring spring 25. Adjusting sleeve 29 is used for setting the spring bias of restoring spring 25 which is in contact with adjusting sleeve 29, the opposite end of restoring spring 25 in turn being supported on valve needle 14, adjusting sleeve 29 also being used to adjust the dynamic spray-discharge volume. A fuel filter 32 is situated above adjusting sleeve 29 in valve sleeve 6.

The fuel injector described thus far is characterized by its very compact design, resulting in a very small, handy fuel injector. These components constitute a preassembled independent assembly, which is designated as functional part 30 in the following. Functional part 30 thus essentially includes electromagnetic circuit 1, 2, 5 and a sealing valve (valve closing body 19, valve seat body 15) including a downstream spray conditioning element (injection orifice disk 21) and valve sleeve 6 as a body.

Independent of functional part 30, a second assembly is produced which is designated in the following as connecting part 40. Connecting part 40 is characterized in particular in that it includes the electrical and the hydraulic connection of the fuel injector. Connection part 40 designed largely as a plastic part therefore has a tubular body 42 used as a fuel inlet connection. A flow bore 43 of an inner connecting tube 44 in body 42 extending concentrically to valve longitudinal axis 10 is used as a fuel inlet, through which fuel flows from the incoming end of the fuel injector in the axial direction.

A hydraulic connection of connecting part 40 and functional part 30 is achieved in the completely assembled fuel injector by bringing together flow bores 43 and 28 of both assemblies in such a way that an unhindered flow of fuel is ensured. When connecting part 40 is mounted on function part 30, a lower end 47 of connecting tube 44 projects into opening 11 of valve sleeve 6 to increase the connection stability. Body 42 made of plastic may be injection molded onto functional part 30 so that the plastic directly surrounds parts of valve sleeve 6 and valve jacket 5. A reliable seal may be achieved between functional part 30 and body 42 of connecting part 40, for example, through a labyrinth seal 46 at the circumference of valve jacket 5

Body 42 also includes an electrical connector 56 which is also injection molded on. The contact elements are electrically connected to magnetic coil 1 at their end opposite from electrical connector 56.

Figure 2:
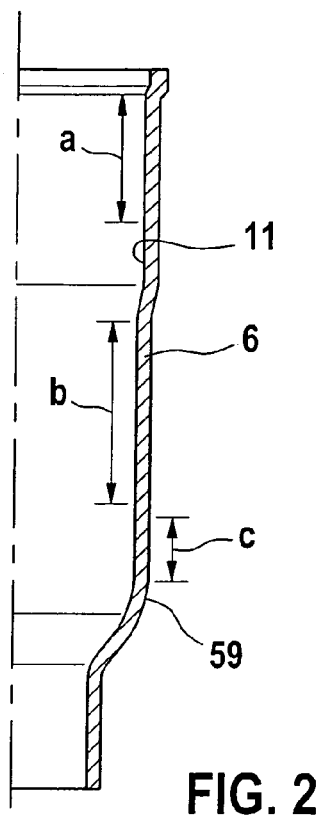
FIG. 2 shows a detail of a valve sleeve.

FIGS. 2 through 7 show metallic components of the fuel injector that are fixedly connected to at least one other metallic component by compression. FIG. 2 shows a detail of a valve sleeve 6, FIGS. 3 and 4 a detail of a connecting tube 44, FIG. 6 a core 2 used as an inner pole and FIG. 7 a detail of a valve jacket 5 in the form of a pot magnet.

In order to fixedly join metallic components together in the fuel injector, press fits between the two components to be attached are suggested. However, press fits generally result in compressions or elongations of a plastic or elastic type in the components as a function of position tolerance, material and component geometry. If, due to their stiffness, the components are unable to expand or compress or they are too soft due to the nature of the material, such as soft magnetic chromium steels, there is a high probability that cold welds ("corroders") will occur during the joining action of the pressing-in. The installation conditions of the components should also be taken into account. If, in the installed condition, the compression joint is, for example, subjected to an internal pressure, this can lead to expansions and widenings. In turn, there exists the risk of the compression joint loosening and in the worst case, the separation of the joint. In order to prevent this, the compression produced should be as great as possible, which, in turn, increases the tendency of the components to form cold welds. Of course, it is possible to narrow the tolerances and improve compression joints using elaborate, precise, and cost-intensive machining operations such as precision grinding or honing.

The goal is, however, to produce compression joints between metallic components using economical components provided as turned parts that reliably remain fixed and tight over a long time period while avoiding cold welds. In doing so, however, the compression joints should be manufactured very simply and cost-effectively, for which reason a separate work operation of coating or oiling or heating the components for shrink fitting is omitted.

FIG. 2 shows, for example, a thin-walled valve sleeve 6 that extends over a large part of the axial length of the fuel injector and into which it is possible to press connecting tube 44 (FIG. 3) in an area a and core 2 (FIG. 4) in an area b and onto which it is possible to press valve jacket 5 (FIG. 5) in an area c.

Figure 3:
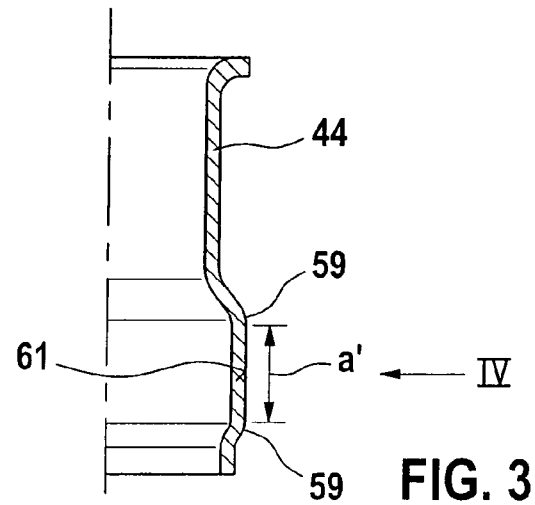
FIG. 3 shows a detail of a connecting tube.

Connecting tube 44 according to FIG. 3 accordingly has an outer compression area a', which in the condition when installed in valve sleeve 6 corresponds to area a to form a compression joint. Areas that principally come into question for a material contact in the compression joint are denoted as a and a'; however, it is by no means necessary for the compression joint to come into being over the entire length of a and a'. Connecting tube 44 should be installed in valve sleeve 6 using as little insertion force as possible. The design of a defined short compression area a' makes it possible to minimize the compression length in advance. Compression area a' of connecting tube 44 is raised compared to the adjoining segments of connecting tube 44. In the transition of compression area a' to the segments following axially on both sides, inlet curvatures 59 are provided that have a relatively large radius. The radii correspond, for example, to an angularity in the transitions of approximately 0.5° to 1.2°.

In compression area a' of connecting tube 44, a surface-roughening structure 61 is provided as an additional measure, thus repeatedly interrupting zones of a possible cold weld. Disadvantageous "corrosion zones" of the compression joint are thus largely avoided. In addition, structure 61 reduces a high negative allowance because plastic deformation and a degree of leveling take place during compression. The profile of structure 61 which is produced must, however, have sufficient strength that an expansion of valve sleeve 6 still occurs even with a low negative allowance.

Figure 4:
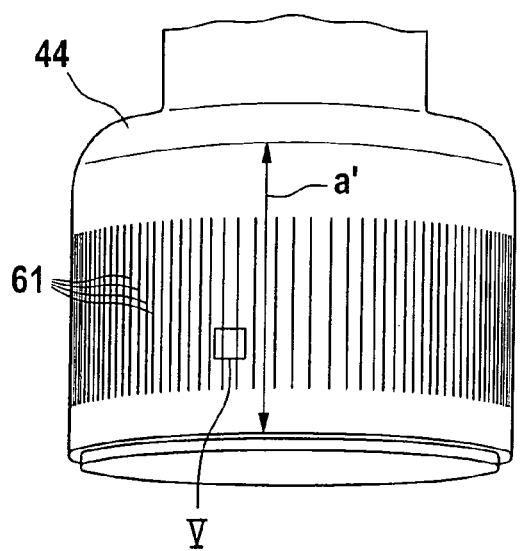
FIG. 4 shows a side view of the connecting tube in the area of the compression area corresponding to view IV in FIG. 3
Figure 5:
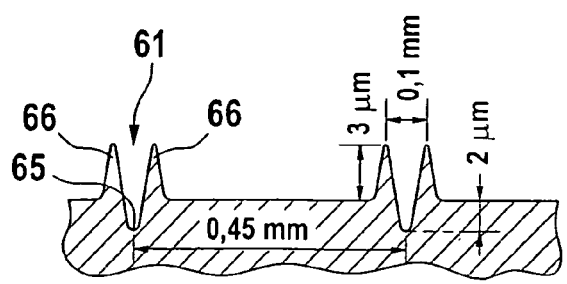
FIG. 5 shows an enlarged segment of the laser structure on the surface of the compression area according to segment V in FIG. 4.

FIG. 4 shows a side view of connecting tube 44 in the area of compression area a' corresponding to view IV in FIG. 3. It is clear that structure 61 may be made up, for example, of a plurality of parallel and overall axially parallel channels. Structure 61 may also be designed differently, e.g., to have a plurality of circumferential channels. FIG. 5 shows an enlarged detail of structure 61 on the surface of compression area a' according to detail V in FIG. 4. It is evident that each individual channel of structure 61 is formed from a deepened groove 65 and two adjacent rises 66 defining groove 65. Grooves 65 have, for example, a depth of approximately 2 µm in relation to the component surface while rises 66 project approximately 3 µm above the surface. The spacing of the two adjacent rises 66 amounts to approximately 100 µm while the spacing of two channels of structure 61 is, for example, approximately 450 µm. With regard to order of magnitude, these sizes also apply to structures 61 that deviate from axially parallel structures 61.

Structure 61 is produced by laser machining, in particular through the use of a marking laser. Laser machining places previously described structure 61 on the desired component surface in the correspondingly provided compression area a', b', c'. The material vaporizing during machining forms chromium oxide on the surface, which has sliding properties and makes the compression joint particularly effective and reliable. Heating of the component surface during laser machining generates metal vapor. Due to the reaction with atmospheric oxygen in the plasma edge zone and during the decomposition of the plasma at the pulse end, metal oxides, in particular chromium oxide, are produced on the surface. The metal oxides are deposited in the immediate vicinity, i.e., on structure 61, and adhere to the component surface as small particles.

It is possible to produce very effective compression joints using previous laser machining, in particular in components made from soft magnetic chromium steel. It is a great advantage that the deposited particles of the metal oxides, chromium oxides in particular, reduce friction and accordingly also the tendency for cold welds to form. The particles have such high bonding strength that only a slight amount is removed by washing.

Figure 6:
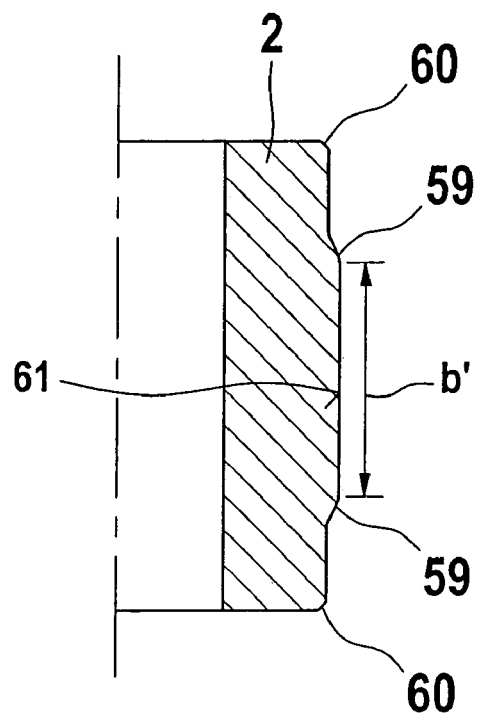
FIG. 6 shows a detail of a core used as an inner pole.

Core 2 according to FIG. 6 has an outer compression area b', which in the condition when installed in valve sleeve 6 corresponds to area b to form a compression joint. Areas that principally come into question for a material contact in the compression joint are denoted as b and b'; however, it is by no means necessary for the compression joint to come into being over the entire length of b and b'. During pressing-in, core 2 should produce only a minimum expansion of valve sleeve 6; therefore the maximum insertion force should, however, be limited. A defined short compression area b' makes it possible to minimize the compression length in advance. Compression area b' of core 2 is raised compared to the adjoining segments of core 2. In the transition of compression area b' to the segments following axially on both sides, inlet curvatures 59 are provided that have a relatively large radius. The radii correspond, for example, to an angularity in the transitions of approximately 0.5° to 1.2°. In the transition of the jacket surface of core 2 to its end surfaces, core 2 may additionally have a circumferential bevel 60, improving the insertion and centering of core 2.

In compression area b' of core 2, instead of inlet curvatures 59 or as an additional measure, a groove-like or channel-like structure 61 produced according to the present invention by a laser is provided on the surface, which consistently interrupts the zones of a possible cold weld. Disadvantageous "corrosion zones" of the compression joint are thus largely avoided. In addition, structure 61 reduces a high negative allowance because plastic deformation and a degree of leveling take place during compression. The profile which is produced must, however, have sufficient strength that an expansion of valve sleeve 6 still occurs even with a low negative allowance.

Figure 7:
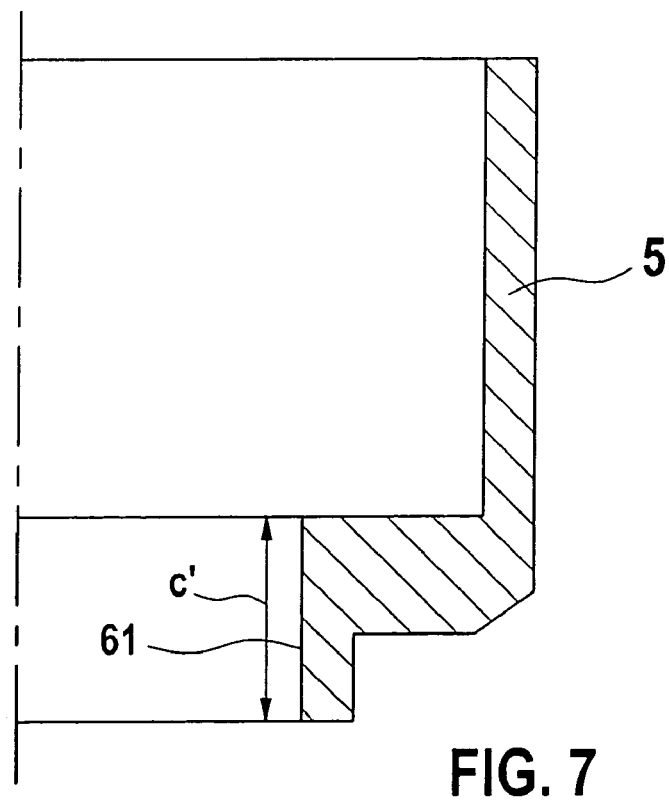
FIG. 7 shows a detail of a valve jacket in the form of a pot magnet.

Valve jacket 5 according to FIG. 7 accordingly has an inner compression area c', which in the condition when placed on valve sleeve 6 corresponds to area c to form a compression joint. Areas that principally come into question for a material contact in the compression joint are denoted as c and c'; however, it is by no means necessary for the compression joint to come into being over the entire length of c and c'. In compression area c' of valve jacket 5, a groove-like or channel-like structure 61 is provided on the surface, thus repeatedly interrupting zones of a possible cold weld. Disadvantageous "corrosion zones" of the compression joint are thus largely avoided. In addition, structure 61 reduces a high negative allowance because plastic deformation and a degree of leveling take place during compression. The profile of structure 61 which is produced must, however, have sufficient strength that a slight plastic deformation of valve sleeve 6 still occurs even with a low negative allowance. A defined short compression area c' makes it possible to minimize the compression length in advance. In contrast to the depiction in FIG. 7, compression area c' of valve jacket 5 may also be raised in relation to the adjoining segments of valve jacket 5, resulting in a more precise definition of maximum compression area c'.

On an axial side, for example, of valve sleeve 6, the transition of compression area c is provided with an inlet curvature 59, which has a relatively large radius. The radius corresponds, for example, to an angularity in the transition of approximately 0.5° to 1.2°.

Compression joints according to the present invention may be used anywhere where the components may not be expanded or compressed due to their stiffness or are too soft due to the nature of the material such as, for example, soft magnetic chromium steels. The compression joints may thus be used in particular in components of electromagnetically operated units such as, for example, electromagnetically driven fuel injectors, ABS valves, solenoid switching valves, fuel injection pumps, etc.

What is claimed is:

1. A metallic compression joint between at least two metallic components that are fixedly joined to one another by compression, comprising:
    at least one component partner including a surface-roughening structure in a compression area thereof, wherein the surface-roughening structure is capable of being generated using a laser; and
    metal oxides deposited on the surface-roughening structure.

2. The metallic compression joint as recited in claim 1, wherein the surface-roughening structure is in the form of one of grooves and channels.

3. The metallic compression joint as recited in claim 2, wherein the surface-roughening structure is in the form of channels that run parallel to one another and are either axially parallel or run circumferentially.

4. The metallic compression joint as recited in claim 2, wherein each channel of the surface-roughening structure is formed as a deepened groove and two adjacent rises defining the deepened groove.

5. The metallic compression joint as recited in claim 4, wherein:
    the deepened groove has a depth of approximately 2 µm in relation to a component surface, and
    the rises project approximately 3 µm above the component surface.

6. The metallic compression joint as recited in claim 1, wherein metallic components joined together by the fixed compression joint are made from a soft magnetic chromium steel and particles of chromium oxide are deposited on the structure as metal oxide particles.

7. The metallic compression joint as recited in claim 1, wherein the laser includes a marking laser.

8. A fuel injector for fuel injection systems of internal combustion engines, comprising:
    a valve seat body;
    a valve seat surface provided on the valve seat body;
    a valve closing body that interacts with the valve seat surface;
    an excitable actuator for actuating the valve closing body;
    a structure including at least one discharge opening; and
    metallic components that are fixedly joined together by compression, wherein:
        a fixed compression joint of at least two of the metallic components includes at least one component partner having a surface-roughening structure in a compression area thereof,
        the surface-roughening structure is able to be generated using a laser, and metal oxides are deposited on the surface-roughening structure.

9. The fuel injector as recited in claim 8, wherein the surface-roughening structure is in the form of one of grooves and channels.

10. The fuel injector as recited in claim 9, wherein the surface-roughening structure is in the form of channels that run parallel to one another and are either axially parallel or run circumferentially.

11. The fuel injector as recited in claim 9, wherein each channel of the surface-roughening structure is formed as a deepened groove and two adjacent rises defining the deepened groove.

12. The fuel injector as recited in claim 11, wherein:
    the deepened groove has a depth of approximately 2 µm in relation to a component surface, and
    the rises project approximately 3 µm above the component surface.

13. The fuel injector as recited in claim 8, wherein the compression area is raised in relation to adjacent component segments.

14. The fuel injector as recited in claim 8, further comprising:
    at least one of a connecting tube, a core, and a valve jacket;
    a thin-walled valve sleeve at least one of:
        into which one of the connecting tube and the core is pressed, and onto which the valve jacket is pressed.

15. The fuel injector as recited in claim 8, wherein the metallic component joined together by the fixed compression joint are made from a soft magnetic chromium steel.

* * * * *